United States Patent [19]

Wheeler

[11] Patent Number: 4,724,284
[45] Date of Patent: Feb. 9, 1988

[54] HIGH VOLTAGE COMPOSITE INSULATOR AND METHOD OF MAKING SAME

[75] Inventor: Edward S. Wheeler, Batavia, N.Y.

[73] Assignee: Lapp Insulator Company, LeRoy, N.Y.

[21] Appl. No.: 822,601

[22] Filed: Jan. 27, 1986

[51] Int. Cl.⁴ .................. H01B 17/02; H01B 17/26; H01B 19/00

[52] U.S. Cl. .................. 174/152 R; 29/450; 29/631; 156/86; 156/294; 174/179; 174/209

[58] Field of Search .................. 174/143, 152 R, 176, 174/177, 178, 179, 186, 209; 29/447, 450, 631; 156/86, 294

[56] References Cited

U.S. PATENT DOCUMENTS

| | | | |
|---|---|---|---|
| 3,898,372 | 8/1975 | Kalb | 174/179 |
| 4,212,696 | 7/1980 | Lusk et al. | 174/179 X |
| 4,296,276 | 10/1981 | Ishihara et al. | 174/179 |
| 4,312,123 | 1/1982 | Wheeler | 174/179 X |
| 4,555,839 | 12/1985 | Thurber | 29/631 X |

FOREIGN PATENT DOCUMENTS 1292276 10/1972 United Kingdom ............... 174/179

*Primary Examiner*—Laramie E. Askin
*Attorney, Agent, or Firm*—Charles E. Baxley

[57] ABSTRACT

A high voltage composite member, such as a support insulator or a bushing, comprises a core and a sheath of elastomeric material vulcanized to the core and at least one module of elastomeric material having an external shed and an inner cylindrical surface of predetermined normal diameter. The sheath has circumferentially continuous external bulges overlapping and engaging the ends of the inner surface to hold the module permanently in a desired location on the sheath, the module being substantially free of deforming stress. A sealing material provides a sealed interface between the module and sheath.

A method of making the member comprises the steps of providing a core having an unvulcanized sheath of elastomeric material thereon, the sheath having a substantially constant outside diameter, providing a module of elastomeric material having an external shed and an inner cylindrical surface of predetermined diameter which is less than the sheath outside diameter, expanding the diameter of the inner surface to permit the module to be slid over the core, placing a sealing material upon the inner surface, sliding the module over the core to a desired location, allowing the module to shrink its inner surface to the sheath outside diameter, and applying heat to vulcanize the sheath and concurrently displace sheath material from within the inner surface as the module returns substantially completely to its unexpanded normal diameter to form bulges adjacent both ends thereof to hold the module in its desired location. The module is substantially free of residual mechanical stress.

20 Claims, 4 Drawing Figures

HIGH VOLTAGE COMPOSITE INSULATOR AND METHOD OF MAKING SAME

BACKGROUND OF THE INVENTION

This invention relates to a high voltage composite member such as a support insulator or a bushing and to a method of making the same.

More particularly, a composite member here of concern is of the type including a central part which, in the case of a support insulator, is a fiberglass reinforced thermosetting plastic rod and which, in the case of a bushing, is a bare conductive rod or tube or a paper-wound conductive rod or tube, with metal foil at appropriate spacings within the paper layers, the whole being impregnated with epoxy to form a solid mass when the epoxy cures. In any case, an elastomeric weathershed housing surrounds the central part. Such a support insulator is then terminated by suitable metal end fittings and such a bushing is typically provided with a mounting flange.

Electrical transmission lines are typically supported by insulators mounted on poles. For many years, porcelain or glass insulators were used for this purpose, but because of certain drawbacks, such as excessive weight and relative fragility, particularly in applications where gunfire vandalism is a problem, procelain and glass insulators are being supplanted by composite insulators as described in the immediately preceding paragraph.

Kalb U.S. Pat. No. 3,898,372, issued Aug. 5, 1975 discloses one of the simplest composite electrical insulators, such comprising a series of separately molded modules each providing a single shed. The modules are compressed between metallic end-fittings on a fiberglass rod. The central aperture of each module has a diameter smaller than the rod diameter. The modules are under hoop tension as a consequence of both the compression between the end-fittings and the diameter difference between the shed aperture and the rod. Any voids between the rod and the modules are filled with a pasty dielectric grease-like material.

Ishihara et al. U.S. Pat. No. 4,296,276, issued Oct. 20, 1981, discloses a composite insulator comprising a plastic rod, a single module having two or more sheds, a pasty dielectric between the rod and the module, and metal end fittings. To reduce hoop tension due to compression of the module between the end fittings, the latter are provided with metal sleeves which are pressed onto the end portions of the module, so that those end portions are sandwiched between the metal sleeves and the plastic rod. The Ishihara et al. patent discloses that the elongation of the outer surface of the module resulting from assembly of the insulator is not higher than 2%, as distinguished from 5% or more in the device of the Kalb patent.

I have found that over extended periods of time, residual elongation of the module may lead to eventual splitting of the elastomer, even when the elongation is as little as 1.5% or less, particularly when other forms of energy such as high electrical stress, high leakage current or even ultraviolet light from the sun are present.

Lusk et al, U.S. Pat. No. 4,212,696, issued July 15, 1980, discloses a variation on the designs discussed above, involving replacement of the pasty dielectric grease-like material of the Kalb patent by an adhesive, but the major drawback, i.e., residual shel elongation, remains.

An alternative prior art design consists of an elastomer weathershed molded directly onto a central core. Such design has been commercially available for many years for distribution voltage insulators. Those insulators are relatively short, generally not exceeding two feet or so in length and can therefore be readily and economically molded by known means in conventional rubber molding presses. However, molded designs become more difficult to produce when the insulator is of a length typical of transmission voltage insulators, which generally exceed three feet in length and frequently are up to ten feet or more in length. For economy, it is desirable to have single piece transmission voltage composite insulators and not a chain of shorter insulators which require numerous expensive metal connectors to tie the chain together. Furthermore, sheds which are molded directly to a central core fiberglass rod do not readily permit undercuts on the sheds, due to difficulty in removing such shapes from inexpensive two-part molds. Undercuts are desirable to provide rain drip points on vertically mounted insulators, to limit leakage current under wet conditions. More complex and expensive multi-part molds are therefore required in order to provide undercuts. Molded distribution composite insulators are normally used in a horizontal mounting, so undercuts are not a requirement for those product sizes.

A superior and more readily produced design uses a sheath extruded directly onto the central core and subsequently vulcanized by known means to the central core. Such a design is described in my U.S. Pat. No. 4,312,123, issued Jan. 26, 1982, now assigned to the assignee hereof. The sheds in that design are provided by modules which are molded separately with a central aperture slightly less in diameter than that of the extruded sheathed core. They are then expanded and placed over the sheath prior to vulcanization of the sheath. Subsequent contraction of the module to the diameter of the sheath (but not to the module's original aperture diameter) provides a firm compression grip of the module to the sheathed core during assembly and vulcanization of the sheath. However, during vulcanization the sheath becomes softened and, due to the clamping pressure produced by the still remaining hoop tension of the expanded module, the sheath flows out slightly from under the module, if the modules do not abut one another nor completely cover the sheath along its length. This flowing out eliminates any residual expansion or elongation of the modules. During vulcanization the sheath will bond to the rod and to the modules, as is well known in elastomer curing technology. Furthermore, there are other significant benefits gained by a design in which the sheath is not entirely covered by the modules. Such benefits include the ability to alter the leakage distance per unit insulator length by spacing the modules more closely or less closely to one another along the length of the sheath. It is, of course, necessary that in such a design the sheath be as resistant to the effects of weather exposure as are the modules. This resistance can be achieved by using a similar composition for both the sheath and the individual modules. Another benefit of the design is that it eliminates problems created by the narrow crevices between abutting sheds that have been associated with such designs and are generally attributed to leakage current effects at such crevices.

This design of separately molded, spaced apart modules over a sheathed core vulcanized to form an integral structure can experience difficulties if the modules do not bond adequately to the sheath during the vulcanization of the sheath. Precautions must be taken to have clean surfaces of both sheath and module in intimate contact throughout the vulcanization step. Although the intimate contact may be achieved by diameter differences between module aperture and sheath as previously described, adequate cleanliness and readily bonded surfaces are less readily achieved consistently. In the usual factory conditions, normal handling can result in deposits from the hands of the workers on the sheath or sheds which may result in poor bonding. Oily deposits or perspiration are particularly serious in this respect.

Additionally, certain ingredients of the compounded rubber which are desirable for other reasons may bloom to the surface during storage of the unassembled components or during processing of the insulator assembly. These ingredients may create a surface condition which is not conducive to adequate bonding during vulcanization. Should voids result between module and sheath, various well known problems of leakage currents, water penetration and possible corona discharges may occur through or in the voids, all of which are deleterious to the insulator performing its function over an extended period of time.

The present invention presents several advantages over previous art, while retaining all of the benefits of my U.S. Pat. No. 4,312,123.

Among these advantages of the present invention are the elimination of the need for vulcanization bonding of the module to the sheath and the consequent enablement of the use of other elastomeric materials for the modules, which materials may be difficult or impossible to bond adequately to the sheath during vulcanization. Particularly useful in this regard are thermoplastic elastomers. Attendant to their use is substantial saving in scrap loss, since thermoplastic materials may be recycled, which is not possible with vulcanized thermosetting elastomeric materials.

Other objects and advantages will appear hereinafter.

SUMMARY OF THE INVENTION

A high voltage composite member according to the invention comprises a core having a central part and a sheath of elastomeric material vulcanized to the core and at least one module of elastomeric material having at least one external shed and an inner cylindrical surface of predetermined normal diameter. The sheath has circumferentially continuous external bulges overlapping and engaging the axial ends of the inner surface of the module to hold the module permanently in a desired axial location with respect to the sheath, and the module is substantially free of residual mechanical stress. A water and dielectric sealing material provides a sealed interface between the module and the sheath.

The method of making the member comprises the steps of providing a core having a central part and an unvulcanized sheath of elastomeric material thereon, the sheath having a substantially constant predetermined outside diameter, providing at least one module of elastomeric material having an external shed and an inner cylindrical surface of predetermined normal diameter which is less than the predetermined outside sheath diameter, expanding the diameter of the inner surface to a diameter sufficiently great to permit the module to be slid over the core, placing a water and dielectric sealing material upon the inner surface, and with the inside diameter so expanded sliding the module over the core to a desired axial location to form an assembly of the core and the module, heating the assembly to vulcanize the sheath and shrink the diameter of the inner surface back toward its normal diameter, the shrinkage squeezing the sheath and displacing material thereof during vulcanization thereof longitudinally from within the inner surface to form bulges adjacent both axial ends thereof to hold the module permanently in its desired axial location, with the module substantially free of residual mechanical stress, and with the sealing material providing a sealed interface between the module and the sheath.

While the invention is hereinafter described with reference to support insulators, it should be borne in mind that it is equally applicable to bushings.

DESCRIPTION OF THE INVENTION

Figure 1:
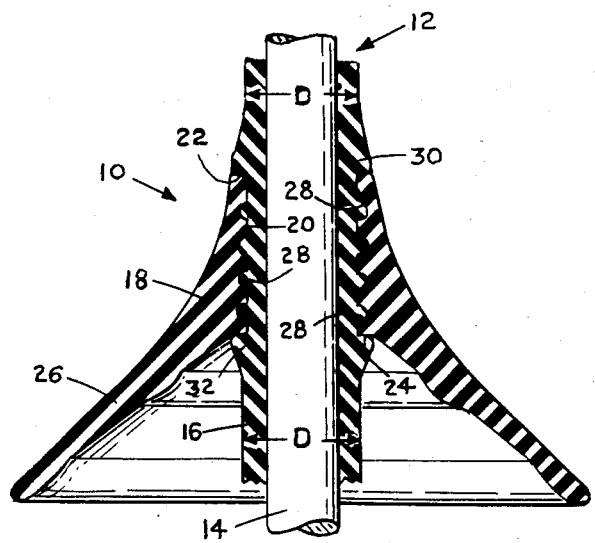
FIG. 1 is a fragmentary axial sectional view of a high voltage composite support insulator embodying the invention, including a central rod, a sheath thereon and a single module.

FIG. 1 shows fragmentarily a high voltage composite insulator, indicated generally at 10, embodying the invention. Insulator 10 includes a core 12 having a central fiberglass reinforced thermosetting plastic part in the form of a rod 14 which may or may not be cylindrical and a sheath 16 of elastomeric material surrounding and vulcanized to rod 14. Insulator 10 further includes a single module 18 of elastomeric material surrounding and fixed in place on core 12.

Module 18 is circumferentially continuous and has an inner cylindrical surface 20 of predetermined normal diameter. Cylindrical surface 20 extends from a top end 22 to a bottom end 24 and module 18 further has a shed 26 flaring radially outwardly and downwardly from bottom end 24. Top end 22 provides module 18 with an upper end and shed 26 provides module 18 with a lower end.

Cylindrical surface 20 may be provided with a plurality of circumferential grooves 28 (best seen in FIG. 3) containing grease which serves as a water and dielectric sealing material (not shown). Alternatively, a thermosetting adhesive may be used for the sealing material, in which case grooves 28 may not be needed.

Sheath 16 has a circumferentially continuous upper bulge 30 overlapping and engaging top end 22 of surface 20 and a circumferentially continuous lower bulge 32 overlapping and engaging bottom end 24 of surface 20. Bulges 30 and 32 maintain module 18 permanently in a desired axial location with respect to sheath 16.

Figure 2:
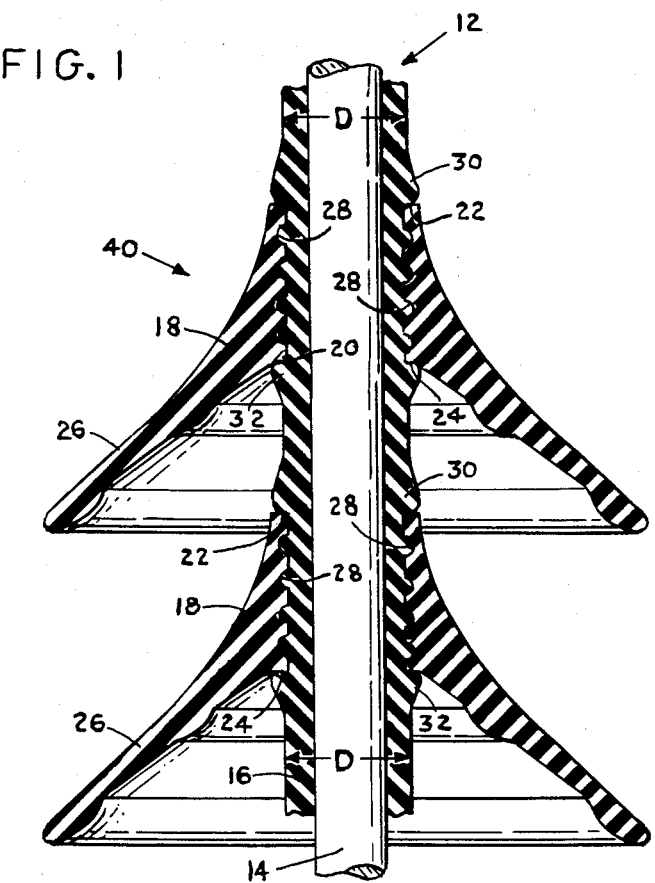
FIG. 2 is a view similar to FIG. 1 but showing an insulator with two modules.

FIG. 2 shows fragmentarily a high voltage composite insulator, indicated generally at 40, embodying the invention. Insulator 40 is similar to insulator 10, in that insulator 40 includes core 12 having fiberglass rod 14 and sheath 16. However, whereas insulator 10 includes a single module 18, insulator 40 includes two modules 18 (an upper module 18 and a lower module 18), each maintained permanentaly in a desired axial location with respect to sheath 16 by an upper bulge 30 and a lower bulge 32 of sheath 16. The spacing between upper module 18 and lower module 18 may be whatever is desired. That is, the distance between bottom end 24 of surface 20 of upper module 18 and top end 22 of lower module 18 may be freely selected.

Sheath 16 is of thermosetting material, such as ethylenepropylene copolymer or terpolymer elastomer. Module 18 may be of the same thermosetting material or may be of thermoplastic elastomer material, preferably of a non-tracking type such as the olefinic thermoplastic elastomers. Further resistance to tracking and erosion may be obtained by known means, such as inclusion of alumina trihydrate in the elastomer formulation.

Figure 3:
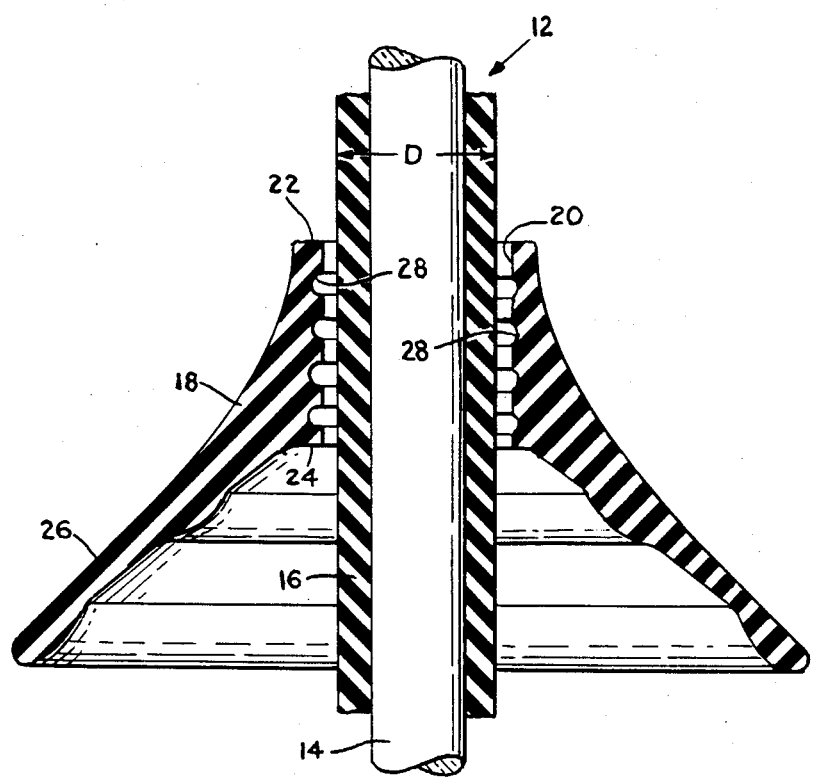
FIG. 3 is a view similar to FIG. 1 but showing the parts at an intemediate stage of manufacture of an insulator embodying the invention.

The method of making insulators 10 and 40 will now be described, with reference to all views. As shown in FIG. 3, which illustrates sheath 16 in its unvulcanized condition, sheath 16 initially has a substantially constant outside diameter D. This constant outside diameter also appears in FIGS. 1 and 2, except at the locations within module surfaces 20 and at the locations of bulges 30 and 32. As stated above, inner cylindrical surface 20 of module 18 is of a predetermined normal diameter, which is less than the diameter D of the sheath as shown in FIGS. 1 and 2.

In the performance of the method, the diameter of surface 20 of module 18 is expanded from its normal inside diameter to an expanded diameter greater than diameter D of sheath 16 and, with the inside diameter of surface 20 so expanded, that module 18 is slid over core 12 to a desired axial location, to form an assembly of core 12 and module 18. When the expansion means is removed, the module will partially return to its unexpanded diameter and in so doing will grip the sheath firmly. The assembly is then heated to vulcanize sheath 16. During heating in the vulcanization step, but prior to the occurrence of crosslinking, surface 20 squeezes sheath 16 as surface 20 returns completely to its unexpanded diameter, displacing the warm sheath material to form bulges 30 and 32 overlapping top and bottom ends 22 and 24, respectively, of surface 20. Bulges 30 and 32 after vulcanization is complete will maintain module 18 permanently in the illustrated axial position on sheath 16. In order both to provide for the shed to return to its original unexpanded inner diameter and for the sheath to form adequately large bulges upon vulcanization, it is necessary to work within a modest range of tolerance on the sheath diameter for any one shed diameter.

The step of expanding surface 20 of module 18 from its normal diameter to its expanded diameter may be facilitated by dilating that diameter and chilling module 18 while dilated, following which it may then be easily slid over and along core 12 to its desired axial location.

The sealing material (grease or thermosetting adhesive) is placed in module 18 before it is slid over core 12. If a grease is used, the module of the resulting product will be rotatable in reference to the sheath. If a thermosetting adhesive is used, care should be taken to select an adhesive which will not set until the heat of vulcanization has caused the material of sheath 16 to form bulges 30 and 32, so that the formation of bulges 30 and 32 will not be constricted by the adhesive. Suitable adhesives are well known.

During the vulcanization operation, sheath 16 bonds to rod 14 and possibly to module 18, depending upon the nature of the latter. Bonding to module 18 may not occur if module 18 is of thermoplastic material. Furthermore, the presence of grease in module 18 may prevent such vulcanization bonding. However, in accordance with the present invention, it does not matter whether or not module 18 vulcanizes to sheath 16.

Figure 4:
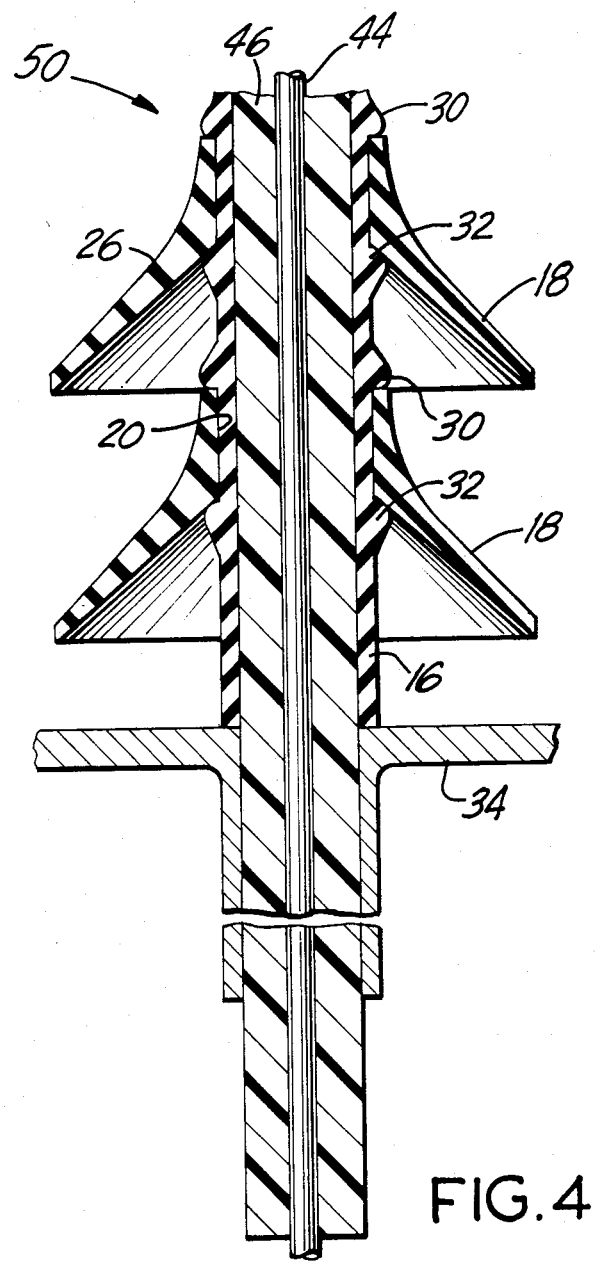
FIG. 4 is a view similar to FIG. 1 showing a bushing embodiment of the invention.

As seen in FIG. 4, the invention is also applicable to a bushing. Therein, a bushing, generally designated 50, includes a central conductor 44, an insulating body 46 surrounding the central conductor 44, a sheath 16 similar in construction to the sheaths of the embodiments of FIGS. 1 and 2, and modules 18 each having a shed 26 and an inner circumferentially continuous surface 20 positioned in spaced relation on the sheath and maintained in place by bulges 30 and 32. The bushing also includes a mounting flange 34 for attaching it to the casing of an electrical apparatus.

Two suspension insulators 40 of the new type disclosed herein were prepared by the method disclosed herein and evaluated by tests known to reveal weaknesses associated with poor module-sheath interfaces. Each insulator 40 had an insulating trunk length 15 inches (38.1 cm) long, with five modules spaced 2.6 inches (6.6 cm) apart, and an arcing distance of 16 inches (40.7 cm) between end-fittings. A silicone grease was placed in the grooves of the weathershed modules prior to assembly. A series of 60 Hz flashover tests on the assembled insulators 40 gave an average value of 178 kV.

Each insulator 40 was subjected to twenty-five negative polarity steepwave impulse flashovers of 470 to 580 kV, with voltage rates of rise between 2500 and 4300 kV/$\mu$s. Repeats of the 60 Hz flashover tests then averaged 177 kV; no damage had occurred. Following this, the insulators 40 were each subjected to 200 kV withstand 60 Hz voltage for one minute under oil without damage. The use of the oil medium permits higher 60 Hz voltage stresses to be applied than can be achieved in air.

The two insulators 40 were next placed in boiling water for 53 hours, then held for 72 hours additional in 50° C. water, following which the 60 Hz flashover voltage was again measured and found to average 180 kV. Immediately afterwards, each insulator 40 was given ten negative polarity and ten positive polarity steepwave impulse flashovers of 640 to 860 kV, with voltage rates of rise betwen 1780 and 3400 kV/$\mu$s. Finally, each insulator 40 was again tested and found to average 179 kV in 60 Hz flashover in air. Close examination of the two insulators 40 revealed that no visual changes had occurred.

Upon cross-sectioning the insulators 40, it was found that the sheaths 16 had flowed not only to the ends of the shed modules 18 to form the distinctive bulges 30 and 32, but also had flowed into the grooves 28 in the neck of the modules 18, thereby providing a more intimate seal and a longer interfacial path.

The invention is well adapted to the attainment of the stated objects and advantages and others.

The disclosed details are exemplary only and are not to be taken as limitations on the invention except as those details may be included in the appended claims.

I claim:

1. A method of making a high voltage composite insulator, said method comprising sequential steps of providing a core having a central part and an unvulcanized sheath of elastomeric material thereon, said sheath having a substantially constant predetermined outside diameter, providing a module of elastomeric material having an external shed and an inner cylindrical surface of predetermined normal diameter which is less than said predetermined sheath outside diameter, expanding the diameter of said inner surface to a diameter sufficiently great to permit said module to be slid over said core, placing a water and dielectric sealing material upon said inner surface, and with said inside diameter so expanded sliding said module over said core to a desired axial location to form an assembly of said core and said module, heating said assembly to vulcanize said sheath and shrink the diameter of said inner surface back toward its normal diameter, said shrinkage squeezing said sheath and displacing material thereof during vulcanization thereof longitudinally from within said inner surface to form bulges adjacent both axial ends thereof to hold said module permanently in said desired location, with said module substantially free of residual mechanical stress, and with said sealing material providing a sealed interface between said module and said sheath.

2. A method according to claim 1 wherein said inner surface is provided with grooves and said sealing material is in said grooves.

3. A method according to claim 1 wherein said sealing material is a grease.

4. A method according to claim 1 wherein said sealing material is a thermosetting adhesive which will not set until after the heat of vulcanization has caused material of said sheath to flow to form said bulges.

5. A method according to claim 1 wherein said insulator is a support insulator.

6. A method according to claim 1 wherein said insulator is a bushing.

7. A method of making a high voltage composite insulator, said method comprising the steps of providing a core having a central part and an unvulcanized sheath of elastomeric material thereon, said sheath having a substantially constant predetermined outside diameter, providing first and second modules of elastomeric material each having an external shed and an inner cylindrical surface of predetermined normal diameter which is less than said predetermined sheath outside diameter, expanding the diameter of said inner surfaces of said modules to a diameter sufficiently great to permit said modules to be slid over said core, placing a water and dielectric sealing material upon said inner surface of each said module, and with said inside diameters so expanded sliding said modules over said core to desired axial locations in which said inner cylindrical surfaces are spaced from each other, thus to form an assembly of said core and said modules, heating said assembly to vulcanize said sheath and shrink the diameter of each said inner surface back toward its normal diameter, said shrinkage squeezing said sheath and displacing material thereof during vulcanization thereof longitudinally from with said inner surfaces to form bulges adjacent both axial ends of each said inner surface to hold said modules permanently in said desired spaced locations, with said modules substantially free of residual mechanical stress, and with said sealing material providing a sealed interface between each said module and said sheath.

8. A high voltage composite insulator comprising a core having a central part and a sheath of elastomeric material vulcanized to said central part and at least one module of elastomeric material having an external shed and an inner cylindrical surface of predetermined normal diameter, said sheath having circumferentially continuous external bulges overlapping and engaging the axial ends of said inner surface to hold said module permanently in a desired axial location with respect to said sheath, and said module being substantially free of residual mechanical stress, and a water and dielectric sealing material providing a sealed interface between said module and said sheath.

9. An insulator according to claim 8 wherein said inner cylindrical surface of said module is provided with grooves and said sealing material is in said grooves.

10. An insulator according to claim 8 wherein said module is rotatable with respect to said sheath.

11. An insulator according to claim 8 wherein said sheath is of thermosetting elastomer material.

12. An insulator according to claim 11 wherein said thermosetting elastomer material is ethylene-propylene elastomer.

13. An insulator according to claim 8 wherein said module is of thermosetting elastomer material.

14. An insulator according to claim 13 wherein said thermosetting elastomer material is ethylene-propylene elastomer.

15. An insulator according to claim 8 wherein said module is of thermoplastic elastomer material.

16. An insulator according to claim 15 wherein said thermoplastic material is of the olefinic elastomer type.

17. An insulator according to claim 8 wherein said sheath is of thermosetting material and said module is of thermoplastic material.

18. An insulator according to claim 8 wherein said insulator is a support insulator.

19. An insulator according to claim 8 wherein said insulator is a bushing.

20. A high voltage composite insulator comprising a core having a central part and a sheath of elastomeric material vulcanized to said central part and first and second modules of elastomeric material each having an extenal shed and an inner cylindrical surface of predetermined normal diameter, said inner cylindrical surfaces being spaced from each other, said sheath having circumferentially continuous external bulges overlapping and engaging the axial ends of the inner surfaces to hold said modules permanently in desired axial locations with respect to said sheath, and said modules being substantially free of residual mechanical stress, and a water and dielectric sealing material providing a sealed interface between each said module and said sheath.

* * * * *